United States Patent
Suzuki

(10) Patent No.: US 9,797,449 B2
(45) Date of Patent: Oct. 24, 2017

(54) TAPERED ROLLER BEARING

(71) Applicant: JTEKT CORPORATION, Osaka-shi, Osaka (JP)

(72) Inventor: Akiyuki Suzuki, Nagoya (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 15/373,004

(22) Filed: Dec. 8, 2016

(65) Prior Publication Data
US 2017/0175815 A1   Jun. 22, 2017

(30) Foreign Application Priority Data

Dec. 17, 2015   (JP) .................................. 2015-245961
Jul. 15, 2016   (JP) .................................. 2016-139972

(51) Int. Cl.
    *F16C 33/66*   (2006.01)
    *F16C 19/36*   (2006.01)

(52) U.S. Cl.
    CPC ........ *F16C 33/6651* (2013.01); *F16C 19/364* (2013.01)

(58) Field of Classification Search
    CPC .................................................. F16C 33/6651
    See application file for complete search history.

(56) References Cited

U.S. PATENT DOCUMENTS

| | | | | |
|---|---|---|---|---|
| 4,699,529 A | * | 10/1987 | Scholl | F16C 33/4605 384/484 |
| 7,950,856 B2 | * | 5/2011 | Sada | F16C 19/364 384/473 |
| 9,644,672 B2 | * | 5/2017 | Nagai | F16C 19/364 |
| 2008/0096715 A1 | * | 4/2008 | Ono | F16H 57/0483 475/160 |
| 2015/0247532 A1 | * | 9/2015 | Suzuki | F16C 33/6674 384/462 |
| 2016/0281773 A1 | * | 9/2016 | Nagai | F16C 19/364 |

FOREIGN PATENT DOCUMENTS

JP   2008-057791 A   3/2008

* cited by examiner

*Primary Examiner* — Thomas R. Hannon
(74) *Attorney, Agent, or Firm* — Oliff PLC

(57) ABSTRACT

A tapered roller bearing includes an outer ring, an inner ring, a plurality of tapered rollers, and a lubricant holding member. The lubricant holding member is provided integrally with the outer ring. The lubricant holding member includes a tubular portion and an annular portion. The tubular portion extends in an axial direction of the outer ring. The tubular portion is positioned at a first end of the outer ring in the axial direction. The annular portion extends inward in a radial direction of the outer ring, from the first end of the tubular portion in the axial direction. A plurality of recessed portions is formed in an inner peripheral surface of the tubular portion in juxtaposition in the circumferential direction.

12 Claims, 13 Drawing Sheets

SMALL DIAMETER SIDE ←→ LARGE DIAMETER SIDE

AXIAL DIRECTION

SMALL DIAMETER SIDE ←——→ LARGE DIAMETER SIDE

AXIAL DIRECTION

SMALL DIAMETER SIDE ←→ LARGE DIAMETER SIDE

AXIAL DIRECTION

SMALL DIAMETER SIDE ←→ LARGE DIAMETER SIDE

AXIAL DIRECTION

TAPERED ROLLER BEARING

INCORPORATION BY REFERENCE

The disclosure of Japanese Patent Applications No. 2015-245961 filed on Dec. 17, 2015 and No. 2016-139972 filed on Jul. 15, 2016 including the specification, drawings and abstract, is incorporated herein by reference in its entirety.

BACKGROUND OF THE INVENTION

1. Field of the Invention

The invention relates to a tapered roller bearing, and in particular, to a tapered roller bearing that supplies a lubricant in a space where tapered rollers roll.

2. Description of the Related Art

A tapered roller bearing includes an outer ring, an inner ring, a plurality of tapered rollers, and a cage. The tapered rollers are arranged such that a central axis of each roller is inclined with respect to a central axis of the tapered roller bearing. At least a part of a large-diameter bottom face (hereinafter referred to as a roller large end face) of the tapered roller is arranged outward of a small-diameter bottom face (hereinafter referred to as a roller small end face) in a radial direction of the bearing.

The tapered roller bearing characteristically needs, for example, to (1) offer enhanced resistance to seizure between the roller large end faces of the tapered rollers and a surface of the inner ring that contacts the roller large end faces (hereinafter referred to as a cone back face rib surface) and to (2) reduce wear between each tapered roller and a corresponding pocket surface of the cage (an inner surface of each pocket formed in the cage and in which the corresponding tapered roller is housed). As such a tapered roller bearing, a tapered roller bearing is known in which a lubricant holding member is attached to the outer ring so that a lubricant can be held in a space between the lubricant holding member and the outer ring (for example, Japanese Patent Application Publication No. 2008-057791 (JP 2008-057791 A)).

The lubricant may be contaminated by foreign matter such as external dust or abrasion powder from the tapered rollers. When the lubricant containing the foreign matter infiltrates in between the tapered roller and a raceway surface, noise may be generated by the foreign matter when one of the inner ring and the outer ring of the tapered roller bearing rotates with respect to the other, and due to the foreign matter, the life of the bearing may be shortened.

SUMMARY OF THE INVENTION

An object of the invention is to reduce possible noise generated by foreign mater contained in lubricant when one of an inner ring and an outer ring of a bearing rotates with respect to the other, and also to suppress a related decrease in the life of the bearing.

A tapered roller bearing in an aspect of the invention includes an outer ring, an inner ring, a plurality of tapered rollers, and a lubricant holding member. A first raceway surface is formed on an inner peripheral surface of the outer ring. The inner ring is arranged coaxially with the outer ring. A second raceway surface is formed on an outer peripheral surface of the inner ring. The tapered rollers are arranged in a space formed between the first raceway surface and the second raceway surface. The tapered rollers are arranged in a circumferential direction of the outer ring. The lubricant holding member is provided integrally with the outer ring. The lubricant holding member includes a tubular portion and an annular portion. The tubular portion extends in an axial direction of the outer ring. The tubular portion is positioned at a first end in the axial direction of the outer ring. The annular portion extends inward in a radial direction of the outer ring, from the first end of the tubular portion in the axial direction. A plurality of recessed portions is formed in an inner peripheral surface of the tubular portion in juxtaposition in the circumferential direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
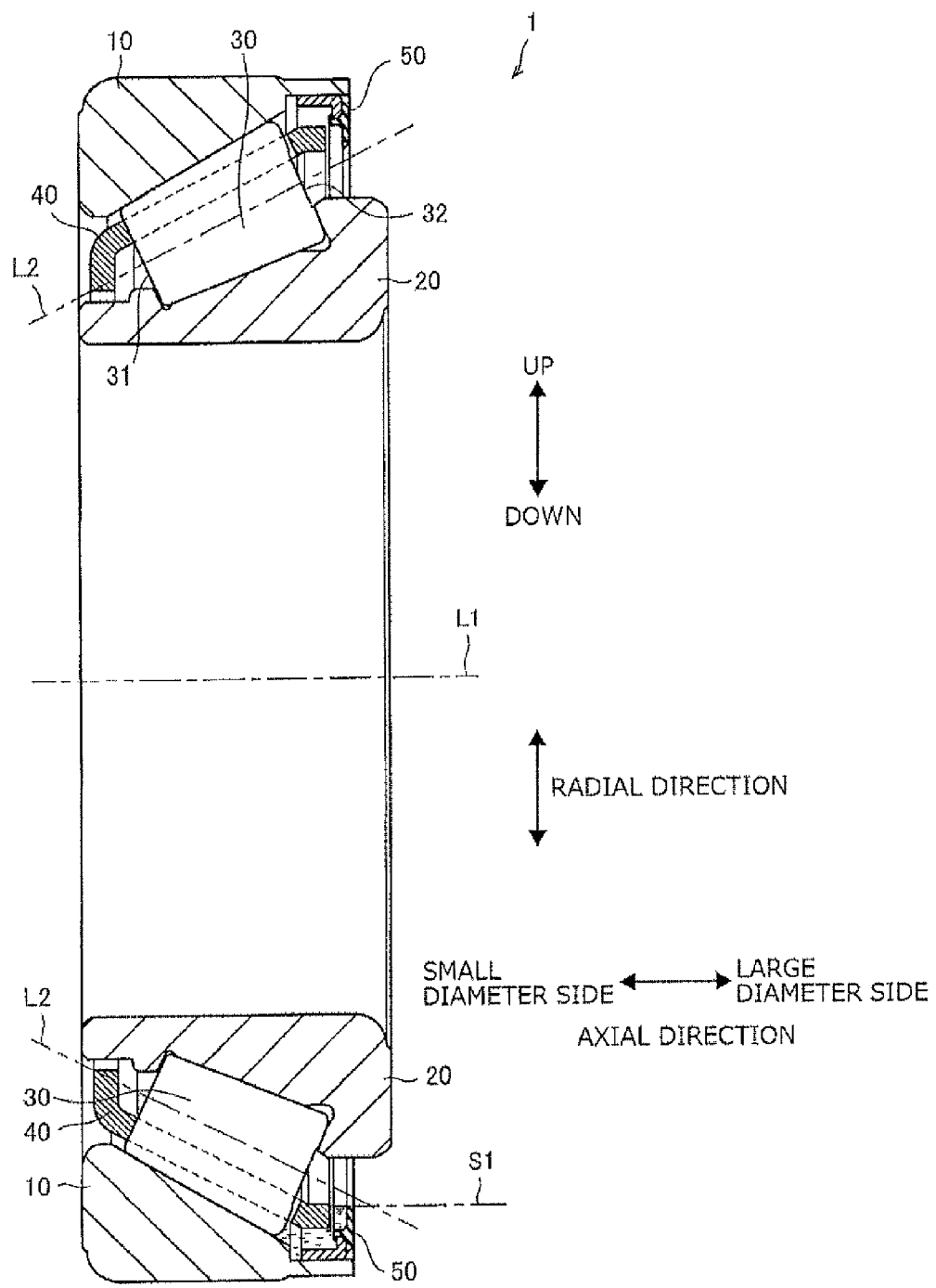
FIG. 1 is a sectional view depicting a general configuration of a tapered roller bearing in a first embodiment.

A tapered roller bearing according to an embodiment of the invention includes an outer ring, an inner ring, a plurality of tapered rollers, and a lubricant holding member. A first raceway surface is formed on an inner peripheral surface of the outer ring. The inner ring is arranged coaxially with the outer ring. A second raceway surface is formed on an outer peripheral surface of the inner ring. The tapered rollers are arranged in a space formed between the first raceway surface and the second raceway surface. The tapered rollers are arranged in a circumferential direction of the outer ring. The lubricant holding member is provided integrally with the outer ring. The lubricant holding member includes a tubular portion and an annular portion. The tubular portion extends in an axial direction of the outer ring. The tubular portion is positioned at a first end of the outer ring in the axial direction. The annular portion extends inward in a radial direction of the outer ring, from the first end of the tubular portion in the axial direction. A plurality of recessed portions is formed in an inner peripheral surface of the tubular portion in juxtaposition in the circumferential direction.

In the tapered roller bearing, the lubricant is held in the space formed between the outer ring and the lubricant holding member. In the tapered roller bearing, the recessed portions are formed in the inner peripheral surface of the tubular portion of the lubricant holding member. Thus, if the lubricant is contaminated by foreign matter such as external dust or abrasion powder from the tapered rollers, the foreign matter is migrated by a flow of the lubricant occurring when one of the inner ring and the outer ring rotates relative to the other, and enters the recessed portions. As a result, the foreign matter is restrained from being trapped between the outer ring and tapered rollers and between the inner ring and the tapered rollers. This allows reduction of possible noise generated when one of the inner ring and the outer ring rotates relative to the other and also of a related decrease in the life of the bearing.

The aspect in which the tubular portion is positioned at the first end of the outer ring in the axial direction includes not only (1) an aspect in which the tubular portion is implemented by the first end itself of the outer ring in the axial direction but also (2) an aspect in which the tubular portion is implemented so as to include a member arranged at the first end of the outer ring in the axial direction and provided separately from the outer ring and (3) an aspect in which the tubular portion is implemented by a member itself that is fixed to the first end of the outer ring in the axial direction and that is provided separately from the outer ring.

The tubular portion may be formed separately from the outer ring. This facilitates formation of the recessed portions in the tubular portion.

The outer ring may include a thin-walled tube portion. The thin-walled tube portion is formed at the first end of the outer ring in the axial direction by an annular step provided on the inner peripheral surface of the outer ring. The thin-walled tube portion extends in the axial direction. The tubular portion includes the thin-walled tube portion and an inner tube portion. The inner tube portion is connected to an outer peripheral edge of the annular portion at a first end of inner tube portion in the axial direction. An outer peripheral surface of the inner tube portion contacts an inner peripheral surface of the thin-walled tube portion in the radial direction. A plurality of cutouts or slots is formed in the inner tube portion so as to be arranged in the circumferential direction. In this case, the recessed portions are implemented so as to include the cutouts or the slots.

Preferably, each of the recessed portions is shaped generally like a rectangle as viewed in the radial direction of the outer ring. A length of each of the recessed portions in the axial direction is larger than a length of the recessed portion in the circumferential direction. In this case, the recessed portions are easily formed regardless of whether the tubular portion is formed of metal or synthetic resin.

In the above-described configuration, while the lubricant flows in the circumferential direction, each of the recessed portions is shaped generally like a rectangle with long sides extending in the axial direction. Thus, foreign matter having entered the recessed portions can be restrained from being swept out of the recessed portions by the lubricant. This allows effective reduction of possible noise generated when one of the inner ring and the outer ring of the bearing rotates relative to the other and of a related decrease in the life of the bearing.

The recessed portions is preferably formed at regular intervals in the circumferential direction. In this case, a number of the recessed portions is preferably at least n that satisfies Expression (1).

$$\frac{360°}{2\theta} \leq n < \frac{360°}{2\theta} + 1 \quad (1)$$

In Expression (1), an integer is denoted by n, and an angle satisfying cos θ=r/R is denoted by θ. A radius of the inner peripheral surface of the tubular portion is denoted by R, and a radius of an inner peripheral edge of the annular portion is denoted by r.

In the above-described configuration, at least one recessed portion is present in a part of the tubular portion in which the lubricant is collected. Consequently, the foreign matter contained in the lubricant can be efficiently housed in the recessed portions.

Preferred embodiments of the invention will be described below in detail with reference to the drawings. In the drawings referred to below, only main members of the component members of the embodiment of the invention are depicted in a simplified manner for convenience of description. Therefore, the invention may include any component members not depicted in the drawings. The dimensions of the members in the drawings do not truly represent the actual dimensions, the dimensional ratio of the members, or the like.

FIG. 1 is a sectional view of a tapered roller bearing 1 in a first embodiment. FIG. 1 is a sectional view of the tapered roller bearing 1 taken along a central axis L1. The tapered roller bearing 1 is used, for example, for a bearing apparatus for driving wheels in a vehicle such as an automobile. The "axial direction" as simply referred to herein means the axial direction of the central axis L1.

As depicted in FIG. 1, the tapered roller bearing 1 includes an outer ring 10, an inner ring 20, a plurality of tapered rollers 30, a cage 40, and a holding member 50. The outer ring 10, the inner ring 20, the cage 40, and the holding member 50 are annular members each having an axis that coincides with the central axis L1 of the tapered roller bearing 1.

As depicted in FIG. 1, the outer ring 10 and the inner ring 20 are arranged such that the inner ring 20 is fitted inward of the outer ring 10 in the radial direction. The cage 40 is arranged in a space between the outer ring 10 and the inner ring 20 in the radial direction. The tapered rollers 30 are held by the cage 40. The holding member 50 is attached to one end of the outer ring 10 in the axial direction.

Each of the tapered rollers 30 is shaped like a truncated cone. A central axis L2 of the tapered roller 30 is inclined with respect to the central axis L1. The distance between the central axis L2 and the central axis Li increases from a small-diameter-side end face 31 (hereinafter referred to as a small end face 31) toward a large-diameter-side end face 32 (hereinafter referred to as a large end face 32) of the tapered roller 30.

In the description below, the side on which the small end face 31 of the tapered roller 30 is located in the axial direction is referred to as a "small diameter side". The side on which the large end face 32 of the tapered roller 30 is located in the axial direction is referred to as a "large diameter side".

Figure 2:
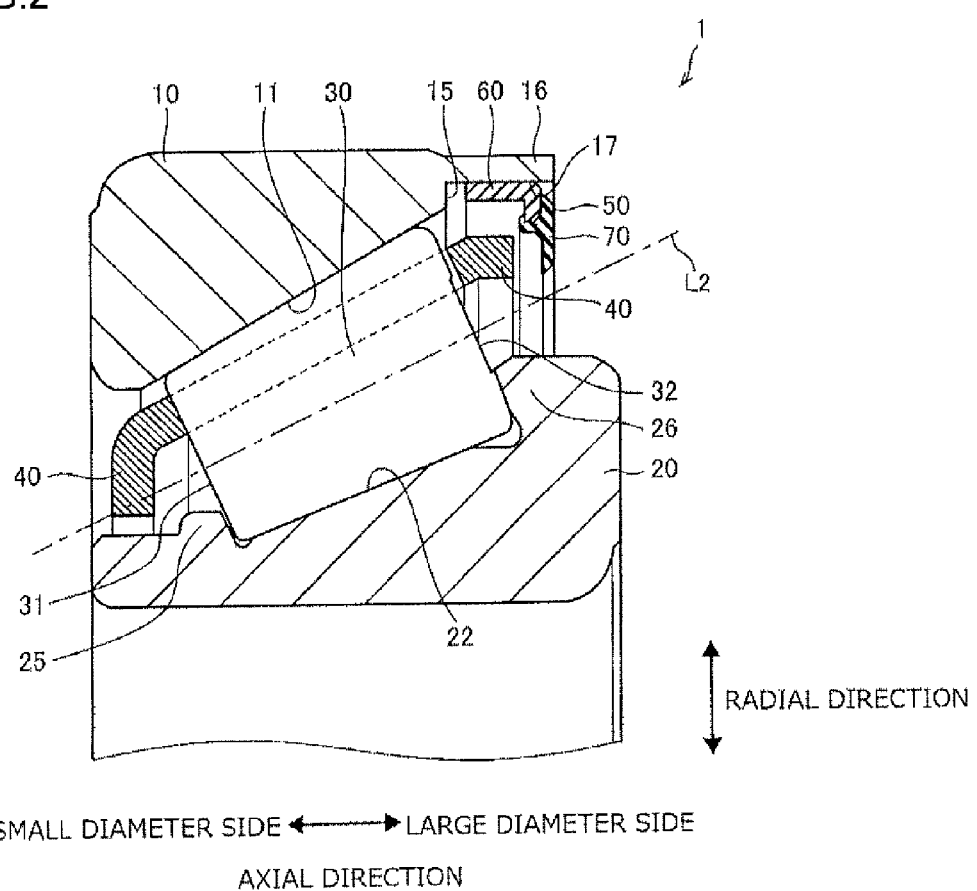
FIG. 2 is a sectional view of the tapered roller bearing in the first embodiment.

FIG. 2 is an enlarged sectional view of a part of the tapered roller bearing 1.

The outer ring 10 has a first raceway surface 11 on an inner peripheral surface of the outer ring 10. The first raceway surface 11 is tapered such that the distance between the first raceway surface 11 and the central axis L1 increases from the small diameter side toward the large diameter side.

An annular step 15 is formed on an inner peripheral surface of the outer ring 10 along a circumferential direction. The step 15 is formed on the large diameter side in the axial direction with respect to a central portion of the outer ring 10. A thin-walled tube portion 16 having a smaller radial thickness than a portion of the outer ring 10 located axially inward of the step 15 is present axially outward of the step 15 of the outer ring 10. The step 15 and the thin-walled tube portion 16 are formed to allow the holding member 50 to be fitted to the outer ring 10.

The inner ring 20 has a second raceway surface 22 on an outer peripheral surface of the inner ring 20 as depicted in FIG. 2. The second raceway surface 22 is tapered such that the distance between the second raceway surface 22 and the central axis L1 increases from the small diameter side toward the large diameter side. The taper angle of the second raceway surface 22 is smaller than the taper angle of the first raceway surface 11.

A portion of the inner ring 20 on the small diameter side with respect to the second raceway surface 22 is a cone front face rib portion 25 formed to be larger in radial dimension than the second raceway surface 22 and facing the small end faces 31 of the tapered rollers 30. A portion of the inner ring 20 on the large diameter side with respect to the second raceway surface 22 is a cone back face rib portion 26 formed to be larger in radial dimension than the second raceway surface 22 and facing the large end faces 32 of the tapered rollers 30.

As depicted in FIG. 2, the tapered rollers 30 are arranged in a space formed between the first raceway surface 11 and the second raceway surface 22. As described above, each of the tapered rollers 30 is shaped like a truncated cone, and the central axis L2 is inclined with respect to the central axis L1.

Figure 3:
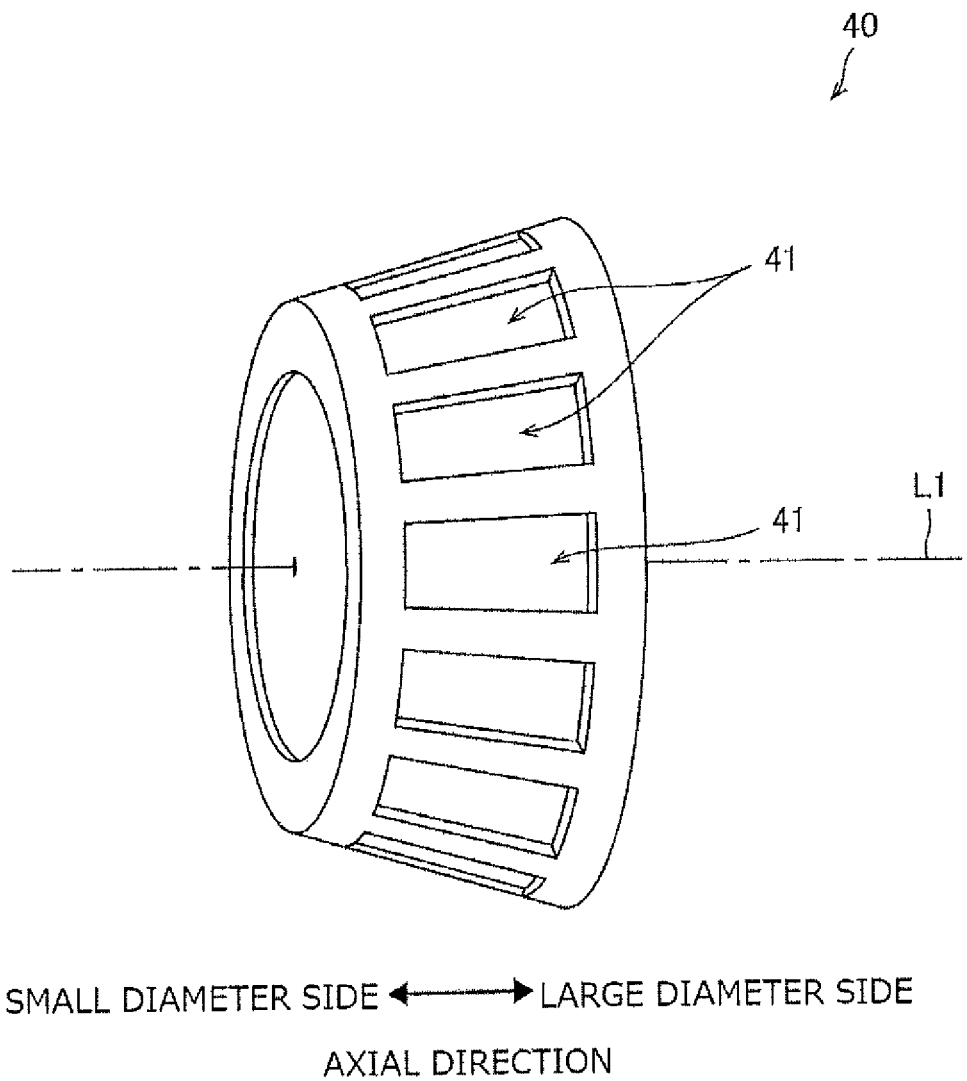
FIG. 3 is a perspective view of a cage.

FIG. 3 is a perspective view of the cage 40. As depicted in FIG. 3, the cage 40 is shaped generally like a circular ring having a taper surface such that the distance between the taper surface and the central axis L1 increases from the small diameter side toward the large diameter side. A plurality of pockets 41 is formed in the taper surface of the cage 40. Each of the pockets 41 in the taper surface is shaped generally like a trapezoid in association with the shape of each of the tapered rollers 30. The cage 40 is formed of metal or resin.

Figure 4:
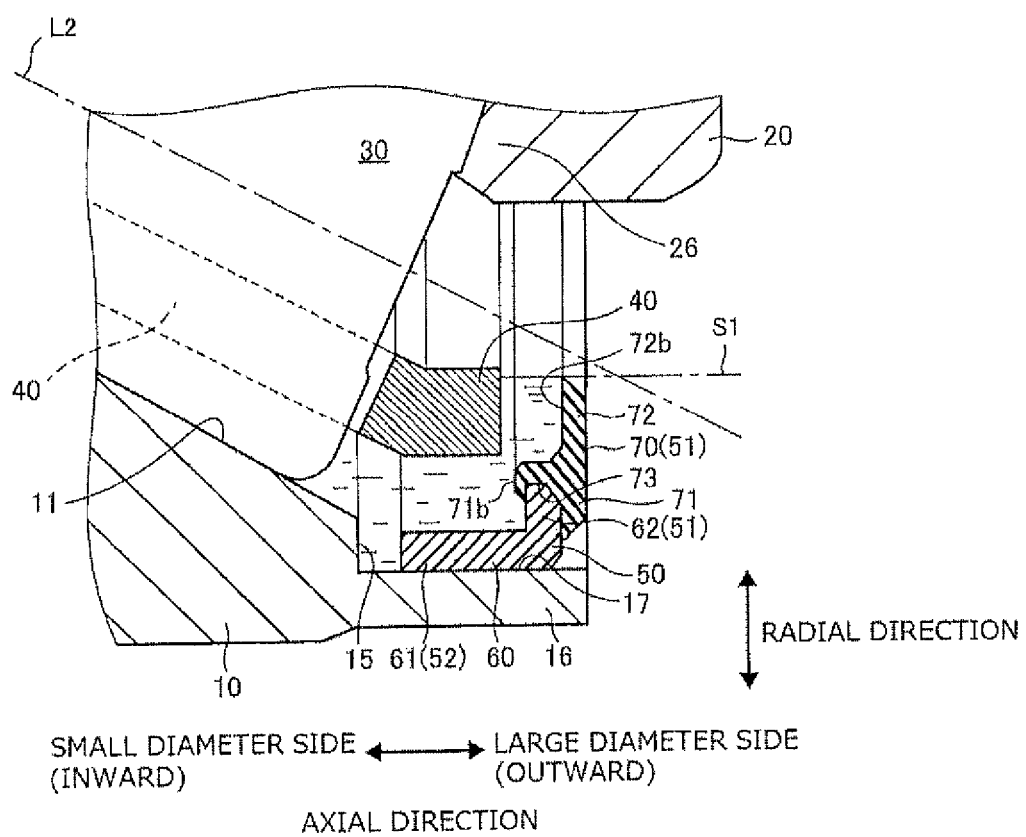
FIG. 4 is a sectional view of the tapered roller bearing in the first embodiment.

FIG, 4 is a sectional view of the tapered roller bearing 1 depicting the holding member 50 and a part of the outer ring 10. As depicted in FIG. 4, the holding member 50 includes a ring 60 and an elastic body lip 70.

The ring 60 includes a cylindrical ring main body 61 and an annular pawl 62 that protrudes inward from an inner peripheral surface of the ring main body 61 in the radial direction. The ring main body 61 and the pawl 62 are integrated together. The outside diameter of the ring main body 61 has an appropriate value to enable the ring main body 61 to be press-fitted internally on an inner peripheral surface of the thin-walled tube portion 16 of the outer ring 10. The pawl 62 is formed outward of the ring main body 61 in the axial direction. The ring 60 is formed of metal, for example, stainless steel. The configuration of the ring 60 will be described below in detail.

The elastic body lip 70 is shaped generally like a circular ring. A radially outward portion of the elastic body lip 70 is a thick walled portion 71 that is thicker than the pawl 62 of the ring 60 in the axial direction. A radially inward portion of the elastic body lip 70 is a thin walled portion 72 that is thinner than the thick walled portion 71 in the axial direction. The elastic body lip 70 is fanned of rubber, for example, nitrile rubber or acrylic rubber.

In the elastic body lip 70, the thick walled portion 71 and the thin walled portion 72 are integrally formed to he continuous with each other. In other words, on an axially inward surface of the elastic body lip 70, a surface 71b of the thick walled portion 71 is positioned inward of a surface 72b of the thin walled portion 72 in the axial direction.

In the thick walled portion 71, a groove 73 extending inward in the radial direction is formed. The groove 73 is fowled all over the circumference of the thick walled portion 71. The size of the groove 73 is set to enable the pawl 62 of the ring 60 to be fitted into the groove 73. The pawl 62 is fitted into the groove 73 to integrally combine the ring 60 and the elastic body lip 70 together, forming the holding member 50.

Since the ring 60 and the elastic body lip 70 are combined together, the shape of the holding member 50 corresponds to the integral shape of a circular-ring-like annular portion 51 and a tubular portion 52. The annular portion 51 corresponds to the pawl 62 of the ring 60 and the elastic body lip 70. The tubular portion 52 corresponds to the ring main body 61.

As depicted in FIG. 4, the ring 60 is fitted to a large diameter-side end of the outer ring 10 such that an outer peripheral surface of the ring 60 contacts an inner peripheral surface of the thin-walled tube portion 16 of the outer ring 10 in the radial direction. Consequently, the outer ring 10 and the holding member 50 are fixed together.

A lubricant is housed in a space formed between the holding member 50 and the outer ring 10 as depicted in FIG. 4. The lubricant is collected in a lower portion of the tapered roller bearing 1 (see FIG. 1). The height of a surface S1 of the lubricant is approximately equal to the height of the elastic body lip 70 at the lowermost portion of the tapered roller bearing 1.

While the tapered roller bearing 1 remains stationary, the lubricant is in contact with a part of the outer ring 10, some of the tapered rollers 30, and a part of the cage 40. Rotation of the tapered roller bearing 1 allows the lubricant collected at the lower portion of the tapered roller bearing 1 to be scooped up in conjunction with the rotation. Consequently, the lubricant is fed to the first raceway surface 11, the second raceway surface 22, and the like. The thus fed lubricant reduces friction that may occur, for example, between each tapered roller 30 and the first raceway surface 11 and between each tapered roller 30 and the second raceway surface 22.

Figure 5:
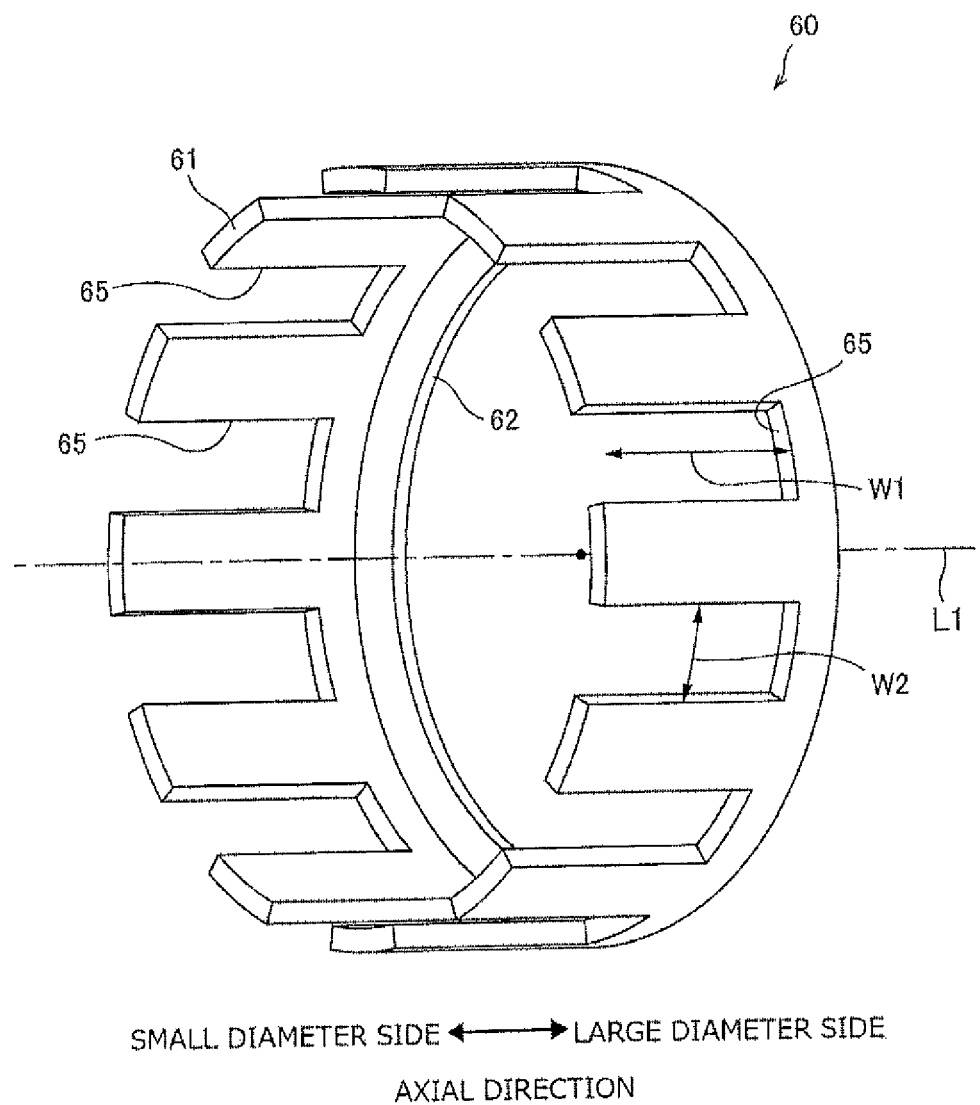
FIG. 5 is a perspective view of a ring.

The ring 60 will be described below in detail. FIG. 5 is a perspective view of the ring 60. As depicted in FIG. 5, a plurality of cutouts 65 is formed in the ring 60. The cutouts 65 are formed to extend axially outward from an axially inward end surface of the ring main body 61.

Figure 6:
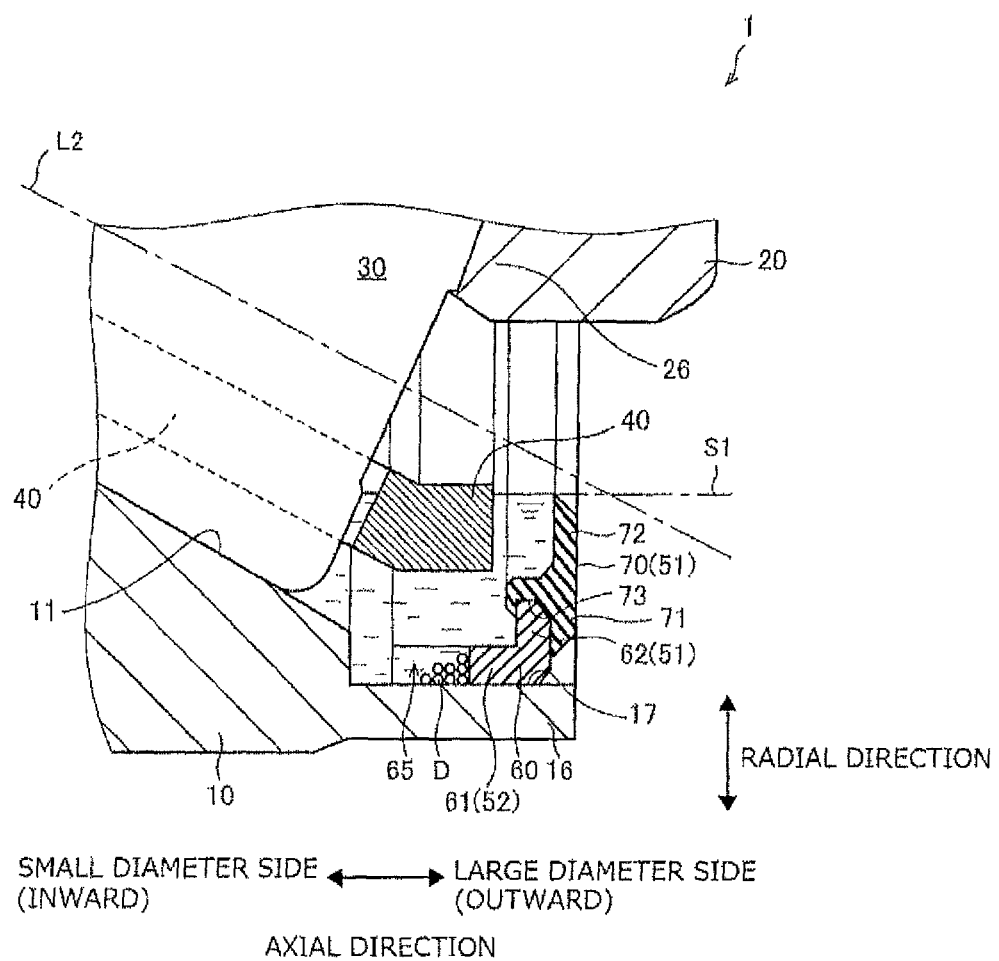
FIG. 6 is a sectional view of the tapered roller bearing in the first embodiment.

FIG. 6 is a sectional view of the tapered roller bearing 1 taken along a plane passing through one of the cutouts 65 formed in the ring 60. As depicted in FIG. 6, the cutouts 65 are also filled with the lubricant.

Each of the cutouts 65 is preferably shaped generally like a rectangle having long sides in the axial direction and short sides in the circumferential direction as depicted in FIG. 5. The cutout 65 has a length W1 of, for example, 2 to 10 mm in the axial direction. When the length W1 of the cutout 65 in the axial direction is larger than 10 mm, the lubricant sealing performance of the holding member 50 may decrease. The cutout 65 preferably has a circumferential width W2 of, for example, 1 to 15 mm. When the circumferential width W2 of the cutout 65 is larger than 15 mm, foreign matter housed in the cutout 65 may flow out of the cutout 65 again in conjunction with a flow of the lubricant.

The cutouts 65 are preferably formed at regular intervals in the circumferential direction as depicted in FIG. 5. The number of the cutouts 65 formed in the ring 60 is, for example, 10 to 35.

Figure 7:
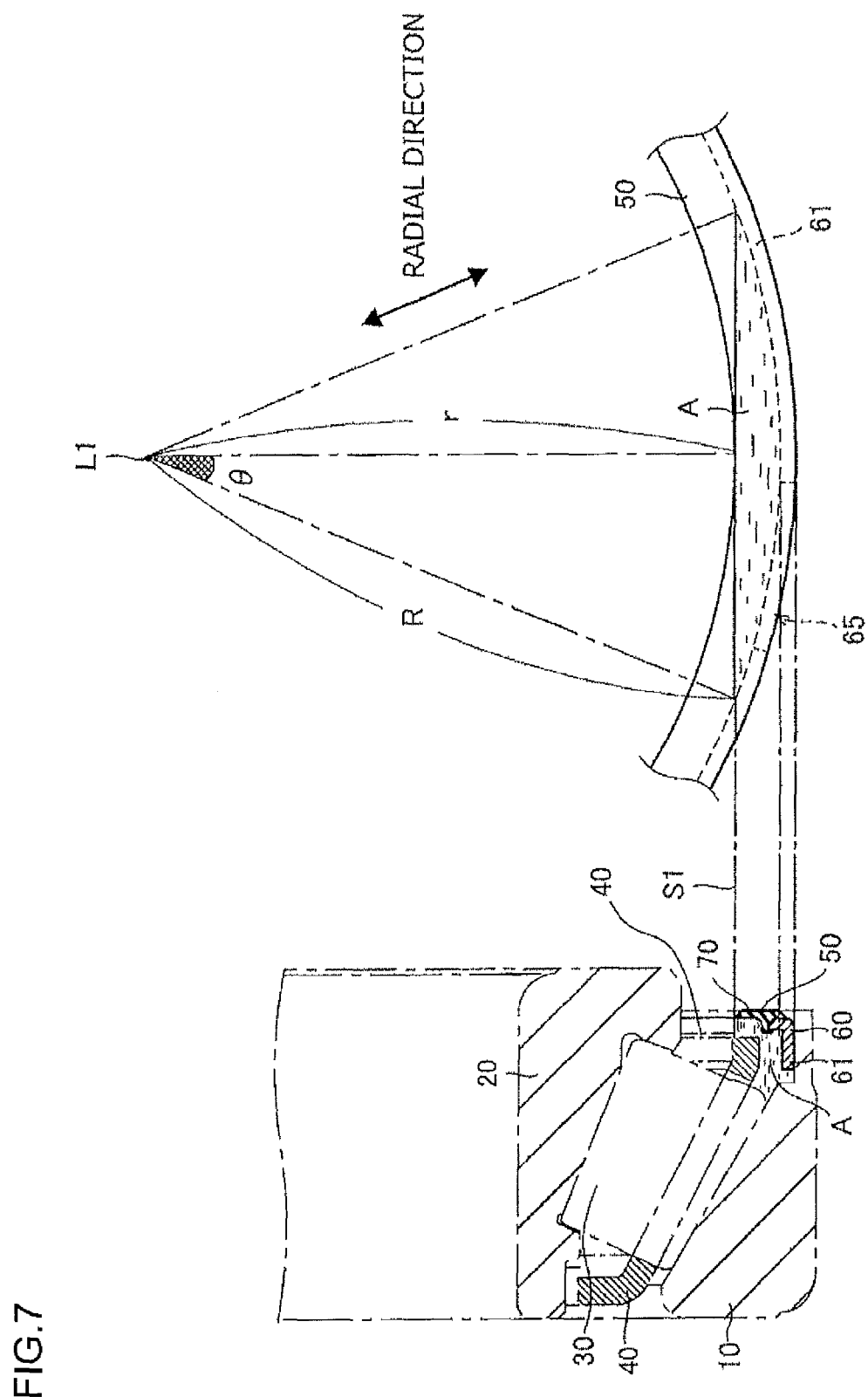
FIG. 7 is a diagram illustrating a portion of the tapered roller bearing in which a lubricant is collected, as viewed from the front in an axial direction.

FIG. 7 is a diagram illustrating the optimal number of the cutouts 65 faulted in the ring 60. A left part of FIG. 7 is a sectional view of the holding member 50, and a right part of FIG. 7 is a schematic diagram of the holding member 50 as viewed in the axial direction. In a space A in FIG. 7, the lubricant is collected. The cutouts 65 are preferably formed such that at least one cutout 65 is present in the space A where the lubricant is collected.

In FIG. 7, a distance between the central axis L1 and the inner peripheral surface of the ring main body 61 is denoted by R. A distance between the central axis L1 and an inner peripheral tip portion of the elastic body lip 70 is denoted by r. The magnitude of an angle defined by cos θ=r/R is denoted by θ. Using r, R, and θ, the integer n is defined by Expression (2) below.

$$\frac{360°}{2\theta} \leq n < \frac{360°}{2\theta} + 1 \quad (2)$$

To allow the cutouts 65 to be formed such that at least one cutout 65 is present in the space A where the lubricant is collected, the number of the cutouts 65 may be set to n or more when the cutouts 65 are formed at regular intervals in the circumferential direction.

When the inner ring 20 of the tapered roller bearing 1 rotates with respect to the outer ring 10, the lubricant is stirred. At this time, the foreign matter contained in the lubricant migrates. Since the cutouts 65 are formed in the ring 60, the foreign matter D enters the cutouts 65 as depicted in FIG. 6. The inner ring 20 rotates with respect to the outer ring 10 with the foreign matter D housed in the cutouts 65, the foreign matter D is restrained from being trapped between the outer ring 10 and the tapered rollers 30 or between the inner ring 20 and the tapered rollers 30. As a result, possible noise can be reduced when the inner ring 20 rotates with respect to the outer ring 10, The life of the tapered roller bearing 1 can be restrained from being shortened by the foreign matter D.

As is apparent from the above description, in the present embodiment, a lubricant holding member is implemented by the thin-walled tube portion 16 and the holding member 50. A tubular portion of the lubricant holding member is implemented by the thin-walled tube portion 16 and the tubular portion 52 (ring main body 61). An annular portion of the lubricant holding member is implemented by the annular portion 51 (the pawl 62 of the ring 60 and the elastic body lip 70).

In the present embodiment, each of the cutouts 65 is shaped generally like a rectangle having long sides in the axial direction and short sides in the circumferential direction as depicted in FIG. 5. Since the circumferential length of the cutout 65 is smaller than the length of the cutout 65 in the axial direction, the foreign matter D housed inside the cutout 65 (see FIG. 6) is restrained from flowing out of the cutout 65 again in conjunction with the flow of the lubricant.

In the present embodiment, the portion in which the foreign matter D is housed is formed as the cutouts 65 extending through the ring 60 from inside to outside thereof in the radial direction. Consequently, even when formed of metal, the ring 60 can be easily molded.

Figure 8:
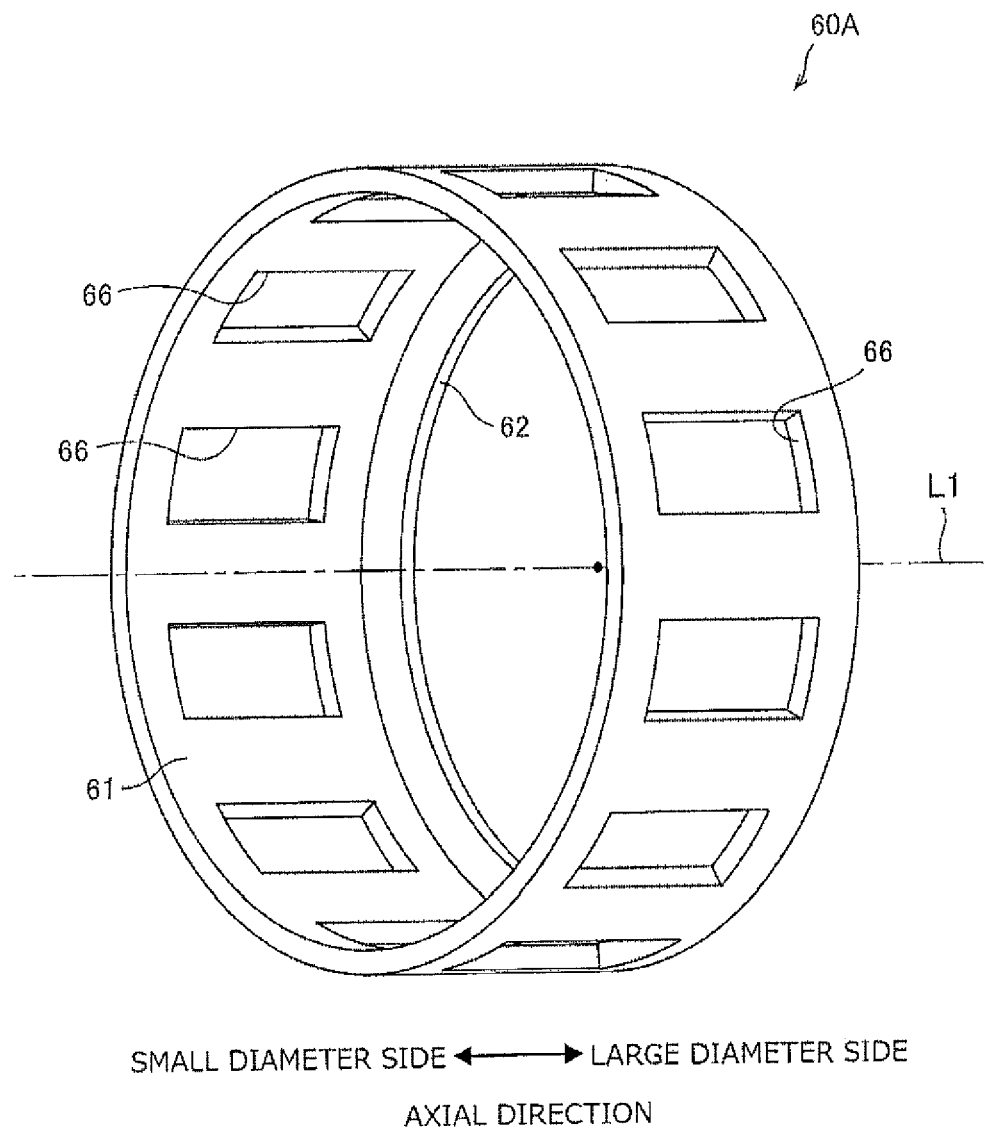
FIG. 8 is a perspective view of the ring in a variation of the first embodiment.

A variation of the first embodiment will be described below. A ring 60A in the variation is different from the ring 60 in the first embodiment in that, instead of the cutouts 65, a plurality of slots 66 is formed in the ring 60A. FIG. 8 is a perspective view of the ring 60A in the variation.

The slots 66 are formed in an axially intermediate portion of the ring 60A. Each of the slots 66 extends through the ring 60 radially from inside to outside, The slot 66 is shaped generally like a rectangle.

The ring 60A in the variation functions as follows. When the inner ring 20 of the tapered roller bearing 1 rotates with respect to the outer ring 10, the lubricant is stirred to migrate the foreign matter contained in the lubricant. The foreign matter is then housed in one of the slots 66 of the ring 60A. At this time, the foreign matter housed in the slot 66 is less likely to flow out of the slot 66 again than in the first embodiment because the slot 66 is enclosed by the ring main body 61 in four directions.

In the first embodiment, each cutout 65 is shaped like a rectangle. However, the shape of the cutout 65 is not limited to the rectangle. For example, the cutout may be L-shaped. In the first embodiment, the rectangular cutout 65 is formed to have long sides extending in the axial direction. However, the arrangement of the cutout is not limited to this. For example, the cutout may be inclined with respect to the axial direction.

However, in view of the easiness of machining the cutouts 65 formed in the ring 60, each cutout 65 is preferably shaped generally like a rectangle.

In the above-described first embodiment, the holding member 50 includes the metal ring 60 and the elastic body lip 70. However, the invention is not limited to this. For example, the holding member 50 as a whole may be formed of an elastic body such as rubber.

Figure 9:
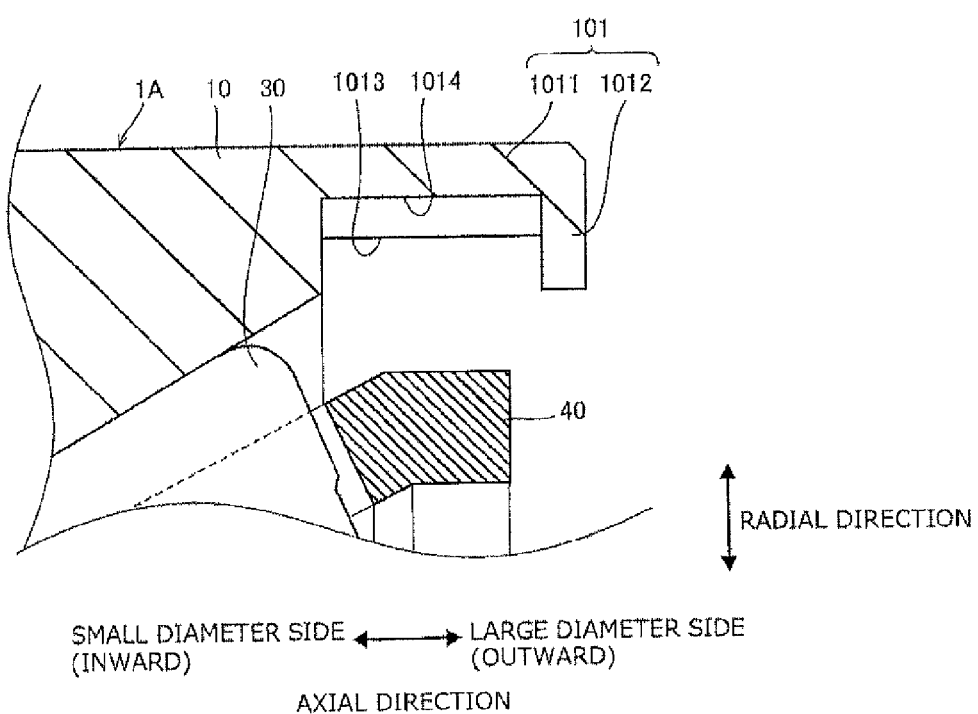
FIG. 9 is an enlarged sectional view depicting a part of a tapered roller bearing in a second embodiment.

With reference to FIG. 9, a tapered roller bearing 1A according to a second embodiment of the invention will be described. In the tapered roller bearing 1A, the lubricant holding member is implemented by a first end 101 of the outer ring 10 in the axial direction. Specifically, the lubricant holding member is configured as follows.

The first end 101 of the outer ring 10 in the axial direction includes a tubular portion 1011 and an annular portion 1012. The tubular portion 1011 and the annular portion 1012 will be described below.

The tubular portion 1011 is shaped like a tube extending in the axial direction. The tubular portion 1011 has an inner peripheral surface 1013. A left end (a small diameter-side end in the axial direction) of the inner peripheral surface 1013 is connected to an outer peripheral edge of the step 15.

The annular portion 1012 is shaped like a circular ring. The annular portion 1012 extends inward in the radial direction from a first end of the tubular portion 1011 in the axial direction.

A plurality of grooves 1014 is formed in the inner peripheral surface 1013 of the tubular portion 1011 as a plurality of recessed portions. The grooves 1014 are formed at regular intervals in the circumferential direction. The grooves 1014 extend in the axial direction. Each of the grooves 1014 is shaped like a rectangle as viewed in the radial direction. The length of the groove 1014 in the axial direction is larger than the length of the groove 1014 in the circumferential direction.

In the tapered roller bearing 1A, the foreign matter can be housed in the grooves 1014 as is the case with the tapered roller bearing 1. This allows reduction of possible noise caused by jamming of the foreign matter and a related decrease in the life of the bearing.

Figure 10:
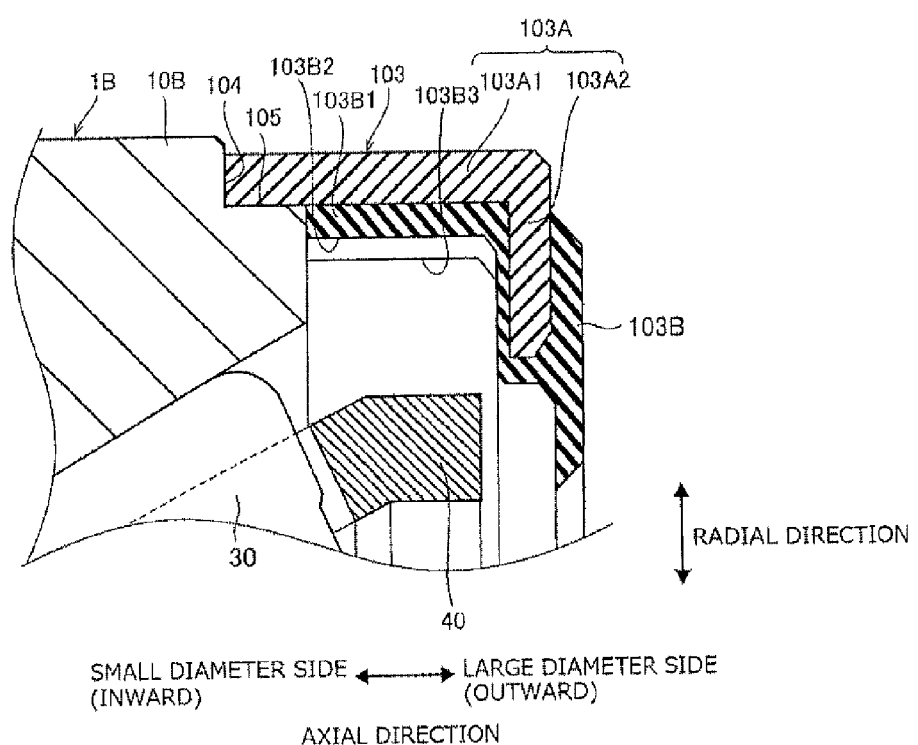
FIG. 10 is an enlarged sectional view depicting a part of a tapered roller bearing in a third embodiment.

With reference to FIG. 10, a tapered roller bearing 1B according to a third embodiment will be described. In the tapered roller bearing 1B, a lubricant holding member 103 is fixed to a first end of an outer ring 10B in the axial direction. Specifically, the tapered roller bearing 1B is configured as follows.

An annular step 104 is formed on an outer peripheral surface of the first end of the outer ring 10B in the axial direction, along the circumferential direction. The step 104 is fainted on the large diameter side with respect to a central portion of the outer ring 10B in the axial direction. A tubular outer peripheral surface 105 extending in the axial direction is formed at an inner peripheral edge of the step 104.

The lubricant holding member 103 includes a ring 103A and an elastic body lip 103B. The ring 103A and the elastic body lip 103B will be described below.

The ring 103A is formed of metal such as stainless steel. The ring 103A includes a cylindrical ring main body 103A1 and an annular pawl 103A2. The pawl 103A2 protrudes inward in the radial direction from a first end (large diameter-side end) of the ring main body 103A1 in the axial direction.

A first end of the outer ring 10B in the axial direction is press-fitted to a second end (small diameter-side end) of the ring main body 103A1 in the axial direction. In other words, a part of an inner peripheral surface of the ring main body 103A1 (a smaller diameter-side part of the inner peripheral surface) is in contact with an outer peripheral surface 105 formed on the outer ring 10B. With the first end of the outer ring 10B in the axial direction press-fitted to the ring main body 103A1, the ring main body 103A1 is in contact with the step 104 in the axial direction.

The elastic body lip 103B is formed of, for example, nitrile rubber or acrylic rubber. The elastic body lip 103B covers substantially the entire pawl 103A2. The elastic body lip 103B includes a covering layer 103B1. The covering layer 103B1 covers the inner peripheral surface of the ring main body 103A1.

A plurality of grooves 103B2 serving as a plurality of recessed portions is formed in an inner peripheral surface 103B3 of the covering layer 103B1. The grooves 103B2 are formed at regular intervals in the circumferential direction. Each of the grooves 103B2 extends in the axial direction. Each groove 103B2 is shaped like a rectangle as viewed in the radial direction. The length of the groove 103B2 in the axial direction is larger than the length of the groove 103B2 in the circumferential direction.

In the embodiment, the tubular portion is implemented by the ring main body 103A1 and the covering layer 103B1, as is apparent from the above description. The annular portion is implemented by the pawl 103A2 and the elastic body lip 103B except for the covering layer 103B1.

In the tapered roller bearing 1B, the foreign matter can be housed in the grooves 103B2 as is the case with the tapered roller bearing 1. This allows reduction of possible noise caused by jamming of the foreign matter and a related decrease in the life of the bearing.

In the tapered roller bearing 1B, the grooves 103B2 are formed in the covering layer 103B1. Thus, the grooves 103B2 are easily formed.

In the tapered roller bearing 1B, the lubricant holding member 103 is provided separately from the outer ring 10B. Thus, the lubricant holding member 103 is easily formed.

In the tapered roller bearing 1B, no thin walled portion needs to be formed in the outer ring 10B. Thus, possible problems such as the breakage of the outer ring during quenching or transportation are prevented.

Figure 11:
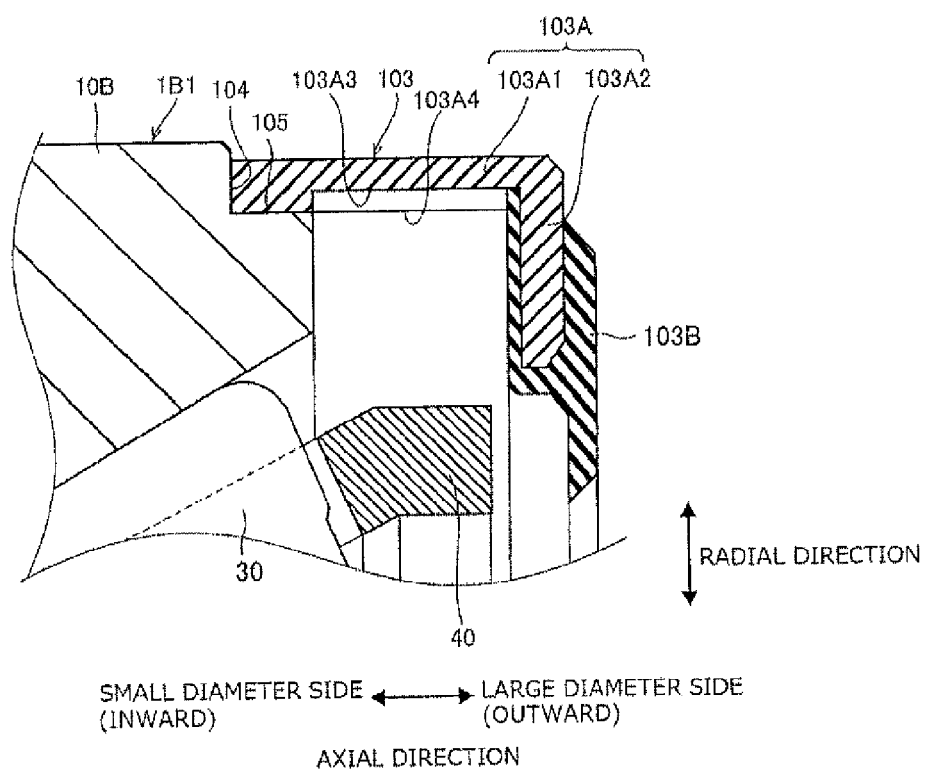
FIG. 11 is an enlarged sectional view depicting a part of a tapered roller bearing in a first variation of the third embodiment.

FIG. 11 is an enlarged view of a part of a tapered roller bearing 1B1 according to a first variation of the third embodiment. In the tapered roller bearing 1B1, the elastic body lip 103B does not include the covering layer 103B1. In this case, a plurality of grooves 103A3 serving as a plurality of recessed portions is formed in an inner peripheral surface 103A4 of the ring main body 103A1.

The grooves 103A3 are formed at regular intervals in the circumferential direction. Each of the grooves 103A3 extends in the axial direction. Each groove 103A3 is shaped like a rectangle as viewed in the radial direction. The length of the groove 103A3 in the axial direction is larger than the length of the groove 103A3 in the circumferential direction.

In the embodiment, the tubular portion is implemented by the ring main body 103A1, as is apparent from the above description. The annular portion is implemented by the pawl 103A2 and the elastic body lip 103B.

In the tapered roller bearing 1B1, the foreign matter can be housed in the grooves 103A3 as is the case with the tapered roller bearing 1. This allows reduction of possible noise caused by jamming of the foreign matter and a related decrease in the life of the bearing.

In the tapered roller bearing 1B1, the grooves 103A3 are formed in the inner peripheral surface 103A4 of the ring main body 103A1. Thus, the tapered roller bearing 1B1 has a larger volume for holding the lubricant than the tapered roller bearing depicted in FIG. 10 (third embodiment). As a result, the tapered roller bearing 1B1 can hold more lubricant.

In the tapered roller bearing 1B1, the lubricant holding member 103 is provided separately from the outer ring 10B. Thus, the lubricant holding member 103 is easily formed.

In the tapered roller bearing 1B1, the lubricant holding member 103 is provided separately from the outer ring 10B. Thus, no thin walled portion needs to be formed in the outer ring 10B. As a result, possible problems such as the breakage of the outer ring during quenching or transportation are prevented.

Figure 12:
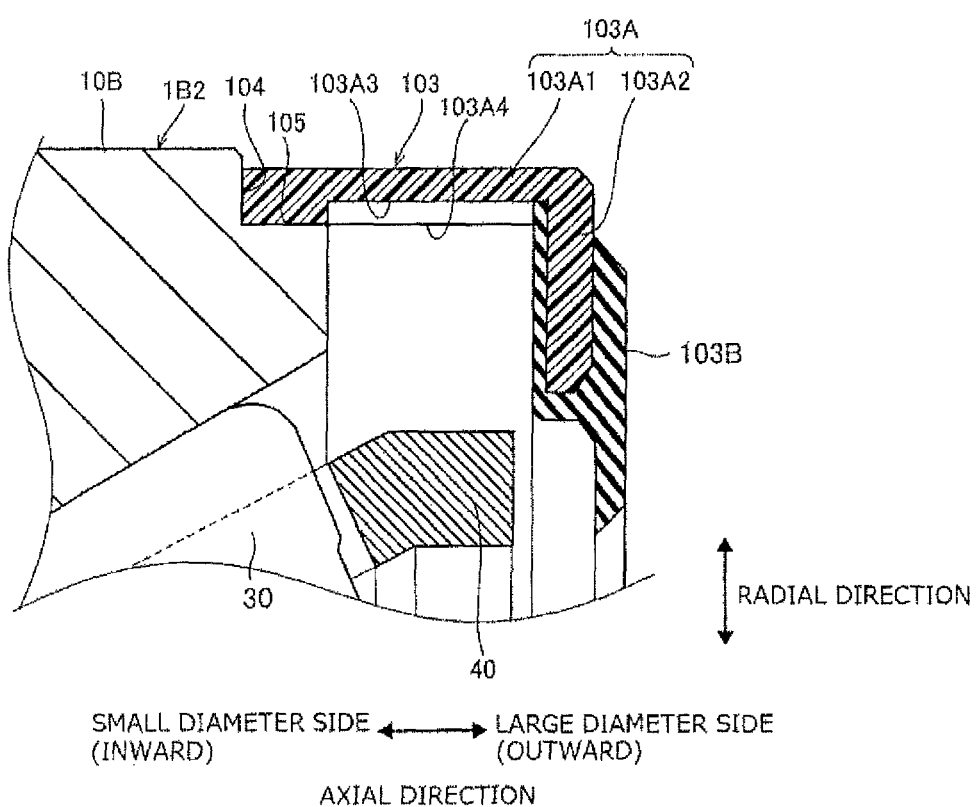
FIG. 12 is an enlarged sectional view depicting a part of a tapered roller bearing in a second variation of the third embodiment.

FIG. 12 is an enlarged view of a part of a tapered roller bearing 1B2 according to a second variation of the third embodiment. A tapered roller bearing 1B2 is different from the tapered roller bearing 1B1 in that the ring 103A is formed of a synthetic resin material. The synthetic resin material is, for example, polyphenylene sulfide (PPS) resin, nylon 46 (PA46), or nylon 66 (PA66).

In the tapered roller bearing 1B2, the foreign matter can be housed in the grooves 103A3 as is the case with the tapered roller bearing 1. This allows reduction of possible noise caused by jamming of the foreign matter and a related decrease in the life of the bearing.

In the tapered roller bearing 1B2, the grooves 103A3 are formed in the inner peripheral surface 103A4 of the ring main body 103A1. Thus, the tapered roller bearing 1B2 has a larger volume for holding the lubricant than the tapered roller bearing depicted in FIG. 10 (third embodiment). As a result, the tapered roller bearing 1B2 can hold more lubricant.

In the tapered roller bearing 1B2, the grooves 103A3 are formed in the ring main body 103A1. Thus, the grooves 103A3 are easily formed.

In the tapered roller bearing 1B2, the lubricant holding member 103 is provided separately from the outer ring 10B. Thus, the lubricant holding member 103 is easily formed.

In the tapered roller bearing 1B2, the lubricant holding member 103 is provided separately from the outer ring 10B. Thus, no thin walled portion needs to be formed in the outer ring 10B. As a result, possible problems such as the breakage of the outer ring during quenching or transportation are prevented.

Figure 13:
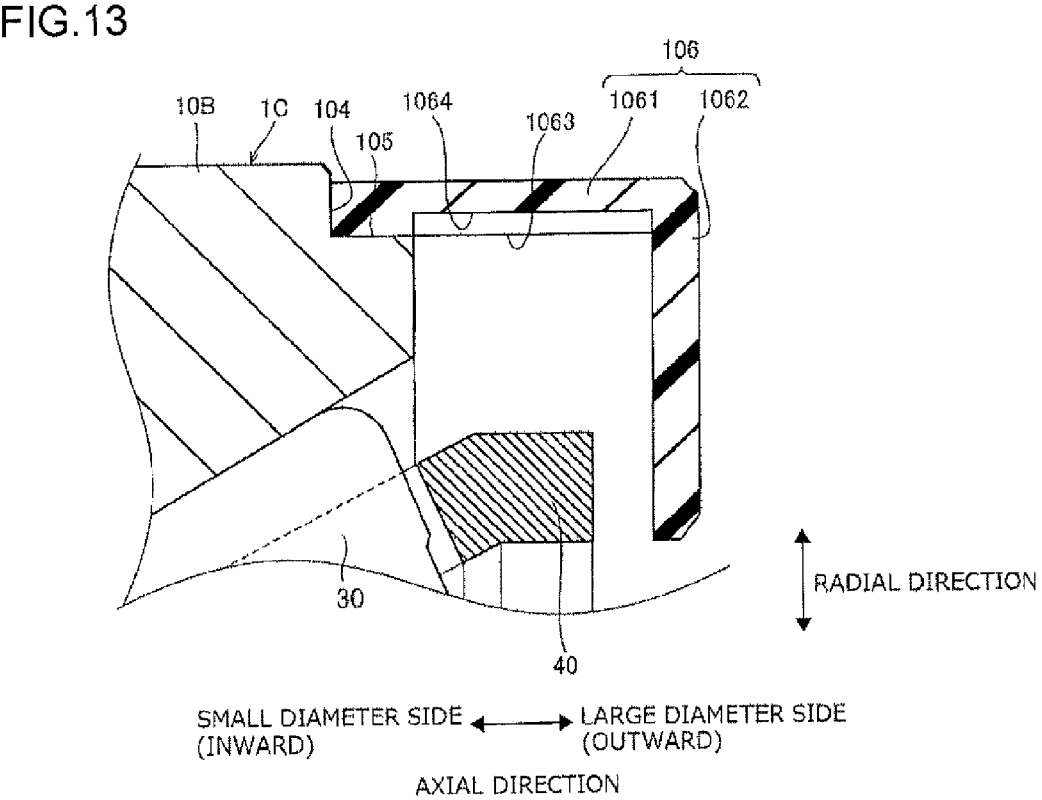
FIG. 13 is an enlarged sectional view depicting a part of a tapered roller bearing in a fourth embodiment.

With reference to FIG. 13, a tapered roller bearing 1C according to a fourth embodiment of the invention will be described. Compared to the tapered roller bearing 1B, the tapered roller bearing 1C includes a lubricant holding member 106 fixed to the first end of the outer ring 10B in the axial direction, instead of the lubricant holding member 103. Specifically, the lubricant holding member 106 is configured as follows.

The lubricant holding member 106 is formed of a synthetic resin material. The synthetic resin material is, for example, polyphenylene sulfide (PPS) resin, nylon 46 (PA46), or nylon 66 (PA66).

The lubricant holding member 106 includes a tubular portion 1061 and an annular portion 1062. The tubular portion 1061 and the annular portion 1062 will be described.

The tubular portion 1061 is shaped like a tube extending in the axial direction. The tubular portion 1061 has an inner peripheral surface 1063, The first end of the outer ring 10B in the axial direction is press-fitted to a left end (a small diameter-side end in the axial direction) of the inner peripheral surface 1063. In other words, a part of the inner peripheral surface 1063 of the tubular portion 1061 (a small diameter-side part of the inner peripheral surface) is in contact with the outer peripheral surface 105 formed on the outer ring 10B. With the first end of the outer ring 10B in the axial direction press-fitted to the tubular portion 1061, the tubular portion 1061 is in contact with the step 104 in the axial direction.

The annular portion 1062 is shaped like a circular ring. The annular portion 1062 extends inward in the radial direction from a first end of the tubular portion 1061 in the axial direction.

A plurality of grooves 1064 serving as a plurality of recessed portions is formed in the inner peripheral surface 1063 of the tubular portion 1061. The grooves 1064 are formed at regular intervals in the circumferential direction. Each of the grooves 1064 extends in the axial direction. Each groove 1064 is shaped like a rectangle as viewed in the radial direction. The length of the groove 1064 in the axial direction is larger than the length of the groove 1064 in the circumferential direction.

In the tapered roller bearing 1C, the foreign matter can be housed in the grooves 1064 as is the case with the tapered roller bearing 1. This allows reduction of possible noise caused by jamming of the foreign matter and a related decrease in the life of the bearing.

In the tapered roller bearing 1C, the grooves 1064 are formed in the tubular portion 1061. Thus, the grooves 1064 are easily formed.

In the tapered roller bearing 1C, the lubricant holding member 106 is provided separately from the outer ring 10B. Thus, the lubricant holding member 106 is easily formed.

In the tapered roller bearing IC, the lubricant holding member 106 is provided separately from the outer ring 10B. Thus, no thin walled portion needs to be formed in the outer ring 10B. As a result, possible problems such as the breakage of the outer ring during quenching or transportation are prevented.

The above-described embodiments are only examples that allow the invention to be implemented. Therefore, the invention is not limited to the above-described embodiments but may be implemented by varying the embodiments as needed without departing from the spirits of the invention.

The tapered roller bearing according to the embodiments of the invention allows reduction of possible noise generated by the foreign matter contained in the lubricant when one of the inner ring and the outer ring of the bearing rotates with respect to the other and also allows suppression of a related decrease in the life of the bearing.

What is claimed is:

1. A tapered roller bearing comprising:
    an outer ring having a first raceway surface on an inner peripheral surface of the outer ring;
    an inner ring having a second raceway surface on an outer peripheral surface of the inner ring and arranged coaxially with the outer ring;
    a plurality of tapered rollers provided in a space formed between the first raceway surface and the second raceway surface and arranged in a circumferential direction of the outer ring;
    a lubricant holding member provided integrally with the outer ring, wherein the lubricant holding member includes:
    a tubular portion extending in an axial direction of the outer ring and positioned at a first end of the outer ring in the axial direction; and
    an annular portion extending inward in a radial direction of the outer ring from the first end in the axial direction of the tubular portion, and
    a plurality of recessed portions is formed in an inner peripheral surface of the tubular portion in juxtaposition in the circumferential direction.

2. The tapered roller bearing according to claim 1, wherein
    the tubular portion may be formed separately from the outer ring.

3. The tapered roller bearing according to claim 2, wherein
    each of the recessed portions is shaped generally like a rectangle as viewed in the radial direction, and a length of each of the recessed portions in the axial direction is larger than a length of the recessed portion in the circumferential direction.

4. The tapered roller bearing according to claim 3, wherein
    the recessed portions are formed at regular intervals in the circumferential direction,
    a number of the recessed portions is at least n that satisfies Expression (1), $$\frac{360°}{2\theta} \leq n < \frac{360°}{2\theta} + 1 \qquad (1)$$

in Expression (1), an integer is denoted by n, and an angle satisfying cos θ=r/R is denoted by θ, a radius of the inner peripheral surface of the tubular portion is denoted by R, and a radius of an inner peripheral edge of the annular portion is denoted by r.

5. The tapered roller bearing according to claim 2, wherein
    the recessed portions are formed at regular intervals in the circumferential direction,
    a number of the recessed portions is at least n that satisfies Expression (1), $$\frac{360°}{2\theta} \leq n < \frac{360°}{2\theta} + 1 \qquad (1)$$

in Expression (1), an integer is denoted by n, and an angle satisfying cos θ=r/R is denoted by θ, a radius of the inner peripheral surface of the tubular portion is denoted by R, and a radius of an inner peripheral edge of the annular portion is denoted by r.

6. The tapered roller bearing according to claim 1, wherein
the outer ring includes a thin-walled tube portion formed at the first end of the outer ring in the axial direction by an annular step provided on the inner peripheral surface of the outer ring, the thin-walled tube portion extending in the axial direction,
the tubular portion includes:
the thin-walled tube portion; and
an inner tube portion connected to an outer peripheral edge of the annular portion at a first end of the inner tube portion in the axial direction and having an outer peripheral surface contacting an inner peripheral surface of the thin-walled tube portion in the radial direction,
a plurality of cutouts or slots is formed in the inner tube portion so as to be arranged in the circumferential direction, and
the recessed portions are implemented so as to include the cutouts or the slots.

7. The tapered roller bearing according to claim 6, wherein
each of the recessed portions is shaped generally like a rectangle as viewed in the radial direction, and a length of each of the recessed portions in the axial direction is larger than a length of the recessed portion in the circumferential direction.

8. The tapered roller bearing according to claim 7, wherein
the recessed portions are formed at regular intervals in the circumferential direction,
a number of the recessed portions is at least n that satisfies Expression (1), $$\frac{360°}{2\theta} \leqq n < \frac{360°}{2\theta} + 1 \qquad (1)$$

in Expression (1), an integer is denoted by n, and an angle satisfying cos θ=r/R is denoted by θ, a radius of the inner peripheral surface of the tubular portion is denoted by R, and a radius of an inner peripheral edge of the annular portion is denoted by r.

9. The tapered roller bearing according to claim 6, wherein
the recessed portions are formed at regular intervals in the circumferential direction,
a number of the recessed portions is at least n that satisfies Expression (1), $$\frac{360°}{2\theta} \leqq n < \frac{360°}{2\theta} + 1 \qquad (1)$$

in Expression (1), an integer is denoted by n, and an angle satisfying cos θ=r/R is denoted by θ, a radius of the inner peripheral surface of the tubular portion is denoted by R, and a radius of an inner peripheral edge of the annular portion is denoted by r.

10. The tapered roller bearing according to claim 1, wherein
each of the recessed portions is shaped generally like a rectangle as viewed in the radial direction, and a length of each of the recessed portions in the axial direction is larger than a length of the recessed portion in the circumferential direction.

11. The tapered roller bearing according to claim 10, wherein
the recessed portions are formed at regular intervals in the circumferential direction,
a number of the recessed portions is at least n that satisfies Expression (1), $$\frac{360°}{2\theta} \leqq n < \frac{360°}{2\theta} + 1 \qquad (1)$$

in Expression (1), an integer is denoted by n, and an angle satisfying cos θ=r/R is denoted by θ, a radius of the inner peripheral surface of the tubular portion is denoted by R, and a radius of an inner peripheral edge of the annular portion is denoted by r.

12. The tapered roller bearing according to claim 1, wherein
the recessed portions are formed at regular intervals in the circumferential direction,
a number of the recessed portions is at least n that satisfies Expression (1), $$\frac{360°}{2\theta} \leqq n < \frac{360°}{2\theta} + 1 \qquad (1)$$

in Expression (1), an integer is denoted by n, and an angle satisfying cos θ=r/R is denoted by θ, a radius of the inner peripheral surface of the tubular portion is denoted by R, and a radius of an inner peripheral edge of the annular portion is denoted by r.

* * * * *